United States Patent [19]

Ditthardt

[11] 4,100,576
[45] Jul. 11, 1978

[54] ELECTROMAGNETIC OPTICAL BEAM CONTROLLER HAVING AN EDDY CURRENT DAMPER FOR ARRESTING MECHANICAL RESONANCE

[75] Inventor: Alfred R. Ditthardt, Glenview, Ill.

[73] Assignee: Zenith Radio Corporation, Glenview, Ill.

[21] Appl. No.: 681,092

[22] Filed: Apr. 28, 1976

[51] Int. Cl.$^2$ .................. H04N 5/76; G11B 7/08; G02B 27/17
[52] U.S. Cl. ................. 358/128; 179/100.3 V; 350/6.5; 350/285
[58] Field of Search ............... 358/128; 179/100.3 V, 179/100.3 E, 100.3 H; 350/6, 285

[56] References Cited

U.S. PATENT DOCUMENTS

| | | | |
|---|---|---|---|
| 653,881 | 7/1900 | Pollak | 179/100.3 H |
| 3,624,284 | 11/1971 | Russell | 179/100.3 V |
| 3,673,412 | 6/1972 | Olson | 179/100.3 V |
| 3,946,166 | 3/1976 | Wossidlo | 179/100.3 V |
| 4,011,003 | 3/1977 | Dragt | 179/100.3 V |
| 4,021,096 | 5/1977 | Dragt | 179/100.3 V |

*Primary Examiner*—Raymond F. Cardillo, Jr.
*Attorney, Agent, or Firm*—Cornelius J. O'Connor

[57] ABSTRACT

An optical beam controller for use in an image reproducing system, in which information is stored in the spiral track of a disc record and retrieved by scanning the track with a light beam, comprises first and second ring-shaped axially poled magnets. The second magnet has a pivot bearing and is supported upon a pin coaxially with and in such proximity to the first magnet as to be mechanically captivated upon the pin by that magnet while remaining free for tilting displacement with respect to a pair of orthogonal axes. A mirror is coupled to the second magnet for concurrent displacement therewith when an energized electromagnet, which reacts with the field of the second magnet, effects a desired displacement of that magnet and the mirror about one or both axes. A damper, disposed adjacent the second magnet, responds to the magnetic field of the second magnet to develop a counter electromagnetic force that reacts with the field of the second magnet to arrest any undesired movement of the second magnet about its support pin.

2 Claims, 8 Drawing Figures

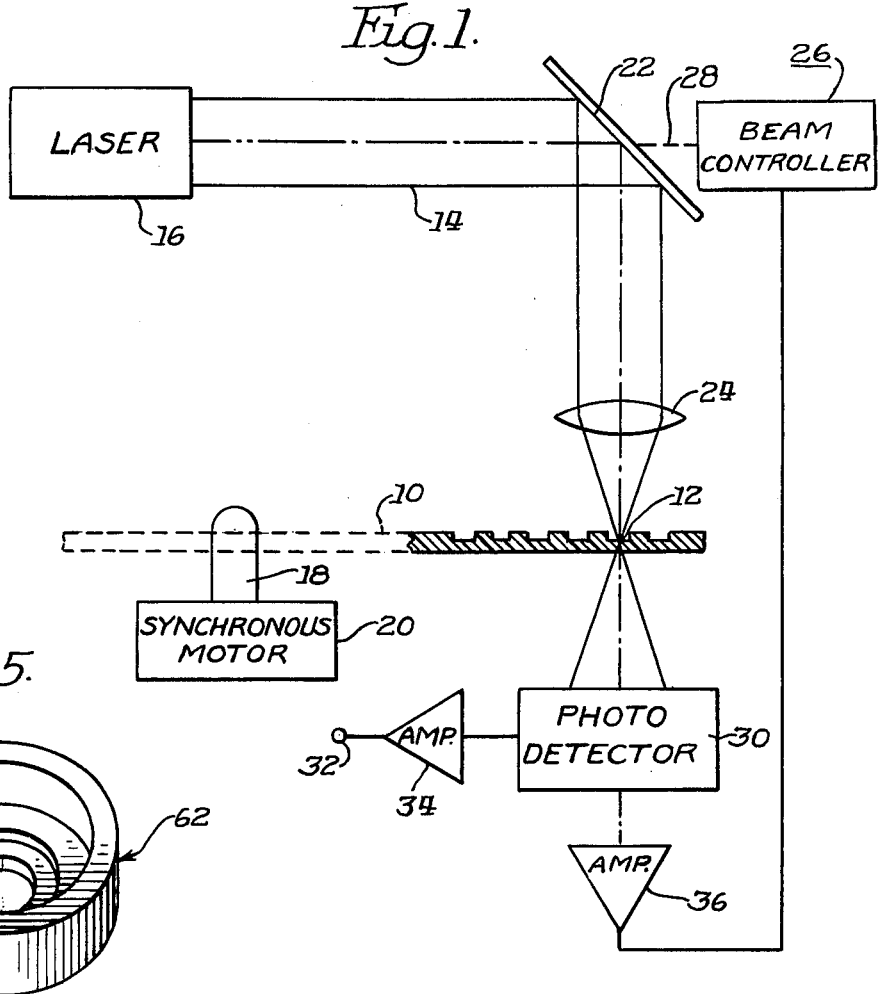
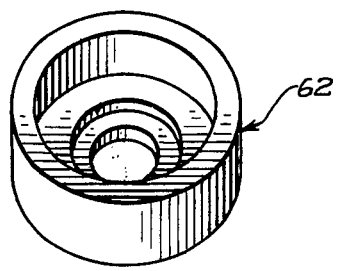
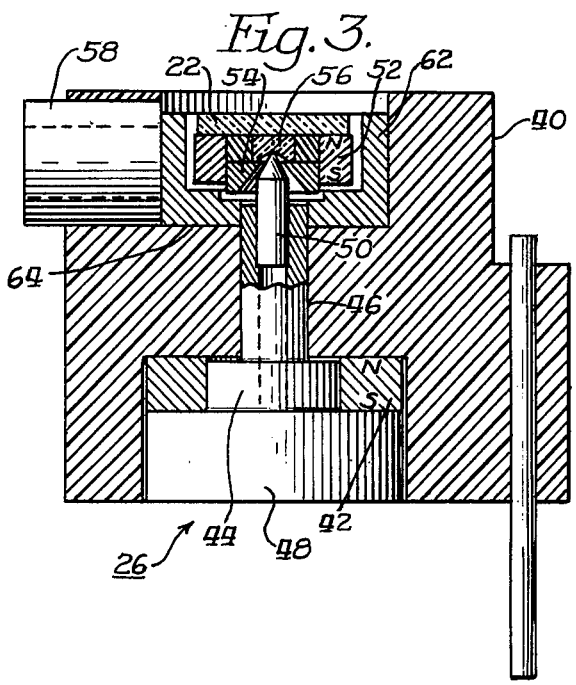
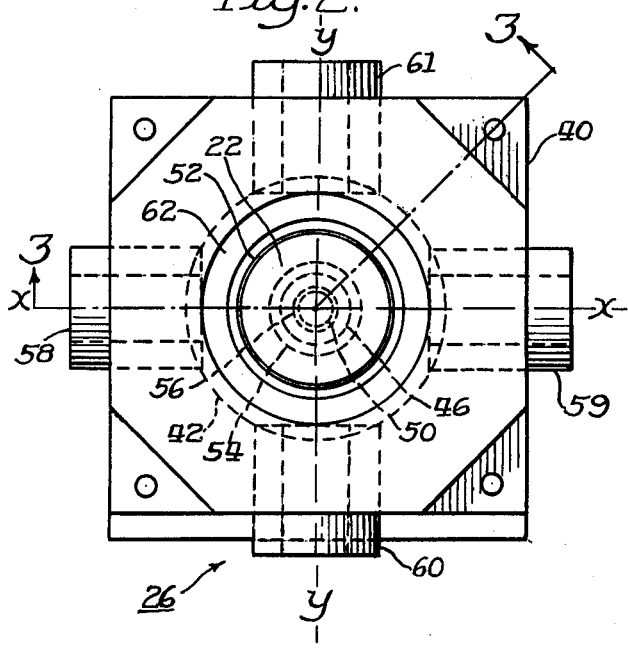

ELECTROMAGNETIC OPTICAL BEAM CONTROLLER HAVING AN EDDY CURRENT DAMPER FOR ARRESTING MECHANICAL RESONANCE

CROSS REFERENCE TO RELATED APPLICATION

The subject invention is a further development of the optical beam tracking arrangement described and claimed in U.S. Pat. No. 3,946,166 which issued to Karl H. Wossidlo on Mar. 23, 1976, which patent is assigned to the assignee of the present invention.

BACKGROUND OF THE INVENTION

This invention relates in general to an optical system employing a beam of optical energy for reading a video disc. More particularly, the invention concerns an improved beam control apparatus for maintaining such a beam in tracking and timing registration with the information bearing track of a record disc.

In the field of video information storage and retrieval, the video disc record has been proposed as an adjunct to the conventional home color television receiver to augment the utility of such a receiver by employing it as a playback device for prerecorded video and audio program materials. The program is stored in a medium, such as a vinyl disc which is similar, in some respects, to the familiar audio disc. A record disc of the type herein considered has the video or other information stored in a spiral track which track physically can take the form of a train of pits and lands and is intended to be read by a beam of light, preferably a laser beam. The track is formed under the control of a carrier signal that is frequency modulated with the information to be stored. A disc of the type herein considered is described and claimed in patent No. 3,931,459, which issued to Adrianus Korpel and which is assigned to the assignee of the subject invention.

The stored program material may include luminance, chroma, audio and synchronizing signals, as well as one or more pilot signals, all judiciously positioned in segments of the frequency spectrum deemed to be convenient for recording on a disc but, at the same time, subject to transformation to a frequency distribution that is compatible with the type of signal (NTSC) which the television receiver was designed to process. As such, the information stored in the record track preferably features double interlaced fields for each picture frame, with each convolution of the spiral containing two such fields together with requisite synchronizing information.

The stored information is retrieved by scanning the track with, preferably, a laser reading beam and utilizing a photoreceptor in an arrangement of the type described and claimed in copending application Ser. No. 519,897, which was filed on Nov. 1, 1974 in the names of Robert Adler et al and assigned to the assignee of this invention, now U.S. Pat. No. 4,001,494 which issued Jan. 4, 1977. Adler et al disclose a photoreceptor matrix that responds to the light energy transmitted through the track to develop signals representing stored information, as well as error signals indicative of tracking misregistration and time base error. In the system herein exemplified, as well as in the Adler et al system, the video disc is transmissive to the reading beam, so that the photoreceptor is located along the beam path and in the far field pattern of the diffracted beam on the side of the record opposite the side scanned by the beam. Positioned in this manner the photoreceptor collects a portion of the light transmitted through the disc.

On the other hand, it is appreciated that the disc can be interrogated in the reflective mode, see for example, application Ser. No. 628,717, filed Nov. 4, 1975, in the name of Leonard Laub, also assigned to the assignee of this invention. In the reflective mode situation, the photoreceptor is located on the same side of the track as the reading beam, again in the far field pattern, to enable it to respond to diffracted light reflected from the track. In either the transmissive or reflective modes the pits and lands serve to diffract or scatter the light of the reading beam so that the photoreceptor, in response to these variations in light intensity, develops an electrical signal bearing modulation which is in accordance with the stored information represented by the pits and lands.

In an optical video system, there is no mechanical coupling between the disc and the read beam, thus a system of the type herein considered frequently experiences radial tracking errors due to eccentricity of the disc and/or of the track which results in misregistration of the reading beam and the track. Additionally, time base errors are also encountered when the disc or track is afflicted by eccentricity, as well as when fluctuations in the rotational speed of the disc are experienced. These tracking and timing errors are compensated by means of beam correction apparatus which can take the form of the electro-optical tracking arrangement disclosed and claimed in the above cited Wossidlo patent No. 3,946,166. Wossidlo's arrangement includes a tracking mirror which is inserted in the path of the reading beam and pivotally supported for adjustable displacement about a pair of orthogonally disposed axes coincident with a radius and with a tangent to the track at the point where the track is being interrogated. Respective correction signals, indicative of the sense and extent of radial tracking and time base errors, can be derived in accordance with the teaching of the aforesaid Adler et al patent and applied to assigned drivers which serve to tilt the mirror about its orthogonal axes to restore proper tracking and timing.

However, as noted by Wossidlo, an electro-optical tracking structure of the type he describes exhibits very low mechanical damping and thus has a pronounced mechanical resonance. This is manifested as an unwanted periodic vibration of the tracking mirror which occurs after a mechanical or magnetic disturbance. While this disturbance can be substantially neutralized when the structure is connected into a high gain servo loop, situations present themselves wherein additional damping is desired. To this end, it has been proposed that such damping be provided by introducing a viscous fluid into the pivot bearing that serves to support the adjustable mirror. However, experience has taught that this expedient has pronounced shortcomings.

OBJECTS OF THE INVENTION

It is, therefore, a principal object of the invention to provide an improved electro-optical apparatus for controlling the reading beam of an optical image reproducing system.

It is a specific object of the invention to provide an improved beam control apparatus having means for automatically damping the mechanical resonance of the apparatus.

It is another object of the invention to provide a reliable, inexpensive damping arrangement for an electro-optical beam control apparatus.

SUMMARY OF THE INVENTION

The improved beam control apparatus herein described has particular application in an optical image reproducing system in which program information is stored as a spiral track on a disc record, and in which information is retrieved by scanning the track with a beam of optical energy. Scansion of the track also serves to derive a pair of correction signals which are related to radial tracking and timing of the beam relative to the track. The beam control apparatus comprises a first ring-shaped axially poled magnet and a second axially-poled magnet having a pivot bearing associated therewith and poled in the same direction as the first magnet. Support means comprising a pin cooperates with the bearing to pivotally position the second magnet coaxially with and in such proximity to the first magnet as to magnetically captivate the second magnet against the pin while permitting tilting displacement of the second magnet with respect to a pair of orthogonally related axes. An optical element, positioned so that the reading beam is incident thereon, is mechanically coupled to the second magnet for concurrent displacement therewith in order to redirect the path of the beam. An electro-magnetic means is positioned along an assigned one of the axes in close proximity to the second magnet and is responsive to one of the correction signals to develop a magnetic field, having a magnitude and direction determined by the amplitude and polarity of the applied correction signal, for reacting with the field of the second magnet to effect a desired displacement of the optical element about the other one of the axes. Damping means comprising a conductive member, disposed adjacent to and completely surrounding the second magnet, respond to the magnetic flux of the field of the second magnet to develop a counter electro-magnetic force for reacting with the field of the second magnet to arrest random or uncontrolled movement of the second magnet about the support pin without inhibiting the desired displacement of the optical element.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIG. 1 is a schematic representation of an optical image reproducing system in which the beam control apparatus of the invention finds particular application;

FIG. 2 is a plan view of a beam control apparatus for use in the system of FIG. 1;

FIG. 3 is a sectional view of the beam control apparatus taken along lines 3—3 in FIG. 2;

FIG. 5 is a perspective view of the damping means employed in the apparatus of FIGS. 2 and 3;

Figure 4:
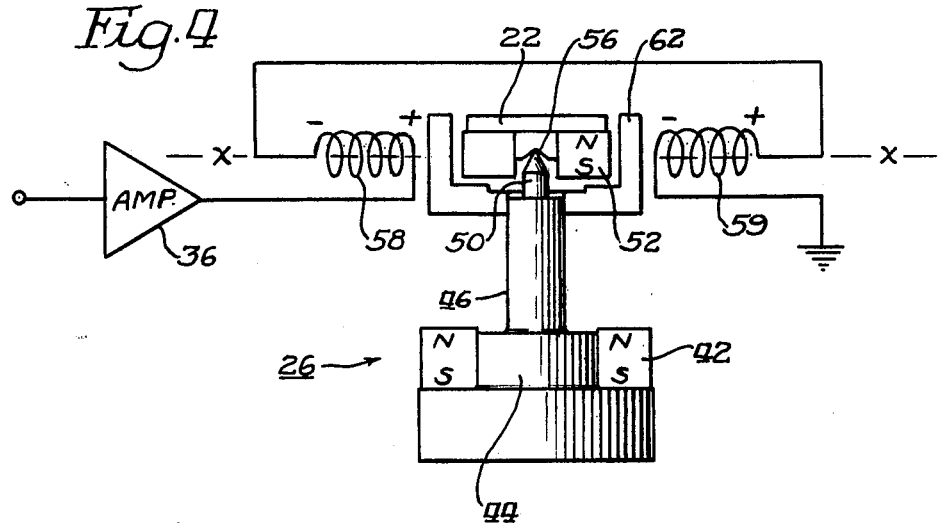
FIG. 4 is a schematic representation of the beam control apparatus of FIGS. 2 and 3 in association with an energizing circuit.

Referring now more particularly to FIG. 1 the image reproducing system there represented derives information from a video disc 10 by scanning the spiral track 12 of the disc with a beam of optical energy that takes the form of a beam of monochromatic coherent light 14 which is derived from a laser 16. Disc 10 is a carrier formed of a suitable material, such as polyvinyl chloride, which has the capability of storing program information. For convenience, it will be assumed that the disc is transmissive to light and that the program material is stored in the multi-turn spiral shaped track 12 pressed or cut into the surface of the disc.

As previously noted, the recorded information can take the form of a succession of cavities or pits alternating with lands disposed along the track to constitute, collectively, spatial representations of the temporal variations of the frequency modulated carrier. To this end, the track may have a uniform width, but the length of the pits and lands varies to establish the aforesaid spatial representations. Each convolution of the track comprises two image fields, a characteristic of the interlaced image transmission practice currently employed in commercial television broadcasting. It will be further assumed that the pit depth is selected to introduce a phase change of $\pi/2$ radians between those portions of the reading beam that enter a pit and those portions that enter an adjacent land. As explained in Korpel's patent, this pit configuration is advantageous in developing tracking information.

Disc 10 is formed sufficiently thin to be flexible and is supported upon the spindle 18 of a drive motor 20. The disc is retained on the spindle by a latching hub which, while not shown, can adopt the construction shown in U.S. Pat. No. 3,838,460, which issued to David S. Stewart and which is assigned to the assignee of the present invention. The disc and spindle, then, are driven at the speed required by the particular recording and playback system selected which, in one proposed system, is 1800 RPM.

The read beam 14 is projected along a path which includes an optical element 22, in the form of an adjustable tracking mirror for altering the path of that beam, and an objective lens 24. This lens serves to focus the beam on track 12 of the disc. In a manner to be detailed below, mirror 22 is adjustable about a pair of orthogonally related axes which, for convenience, are designated X—X and Y—Y, by a beam controller 26 which is coupled to the mirror, which coupling is schematically represented by the broken construction line 28. As will be shown, mirror 22, upon adjustment, alters the path of read beam 14 to compensate for radial tracking as well as for time base errors.

As previously indicated video disc 10 is assumed to be transmissive so that a photodetector arrangement 30, positioned beneath the disc in the path of beam 14, gathers the diffracted rays of the light beam as they exit from disc 10. By resort to a photodetector matrix of the type described in the Adler et al patent, which comprises a plurality of photocells, arrangement 30 derives signals conveying the information stored in the disc and supplies such information to an output terminal 32 via an amplifier 34. These signals, after suitable transcoding, may be coupled to the antenna terminals of a color television receiver for utilization therein.

In addition, and as also disclosed in the Adler et al patent, the photodetector matrix of arrangement 30 can include circuits for differentially combining output signals from selected ones of the photocells to develop radial error correction signals as required for compensating for irregularities in radial tracking. Moreover, this matrix can also be employed in conjunction with a pilot signal, included in the derived information signals, to develop a timing error correction signal having an amplitude and polarity indicative of the timing error.

Alternatively, a timing correction signal may be developed in a phase comparison device which compares the phase of the horizontal synchronizing components included in the derived information signals, with a phase reference generated by a crystal controlled 3.58MHz generator normally associated with a video disc player. This phase comparison produces a signal having an amplitude related to the degree of timing error and a polarity determinative of the sense (advanced or retarded) of the error.

In any event, the above described tracking and time base correction signals are coupled through an amplifier 36 and utilized to energize beam controller 26 to selectively position mirror 22 in respect to the aforementioned orthogonally related axes X—X and Y—Y. At this juncture, it is to be noted that the relevant portions of the aforesaid Adler et al patent bearing on their photodetector matrix are expressly incorporated herein.

Assuming for the moment that tracking registration is maintained, in order to read out all segments of track 12 it is necessary to move the reading beam continually in a radial direction over the disc at a predetermined speed if the track is to be scanned or read without interruption from start to finish. For this crossfeed purpose, therefore, a carriage must be provided to transport mirror 22, lens 24, photoconductor 30 and beam controller 26 across the disc. Since a carriage forms no part of the subject invention, one will not be detailed here. However, such a carriage can adopt the construction shown in copending application Ser. No. 592,710, filed July 2, 1975, in the name of Adrianus Korpel and assigned to the assignee of the present invention. Korpel's carriage disclosure is likewise expressly incorporated herein.

An improved controller 26 for responding to the abovementioned radial tracking and timing correction signals will now be described in detail. The controller is shown in FIGS. 2 and 3 and is similar, in some respects, to the tracking apparatus disclosed by Wossidlo in his patent No. 3,946,166 but, departs significantly from Wossidlo in that the subject beam controller employs a damping means to arrest or neutralize an inherent resonance of such apparatus. More particularly, the beam controller 26 of FIGS. 2 and 3 comprises a centrally relieved housing 40 which accommodates a first ring-shaped magnet 42 that is axially polarized in the direction indicated by the N-S pole designation. Magnet 42 is supported upon the pedestal portion 44 of a centrally disposed post 46. This pedestal is retained within an end cavity of the housing by a plug 48 that urges the post pedestal 44 and magnet 42 against an end wall of the housing cavity. Post 46 presents, at its upper extremity, a support pin 50, preferably formed of tungsten, which terminates in a sharply defined radius and which projects axially of post 46 to cooperate with a bearing now to be described.

A second axially polarized ring-shaped magnet 52, smaller in diameter than magnet 42 but with its poles oriented in the same direction as that magnet, is provided with a central aperture for accommodating a cone shaped guide 54 that leads to a pivot bearing 56 which, preferably, comprises a hardened jewel type element having a cavity for receiving the rounded tip of pin 50. As shown, guide 54 and jewel 56 are disposed in coaxial relation in order to facilitate a proper mating of the tip of pin 50 with the cavity of jewel 56. This arrangement provides magnet 52 with a universal pivot while precluding lateral movement of the magnet in its own plane. Arranged in this fashion, that is atop pin 50 and in coaxial proximity to magnet 42, a form of magnetic levitation obtains between the two magnets with the result that magnet 52 is captivated upon pin 50 by magnet 42. However, magnet 52 still remains free for tilting displacement with respect to orthogonally related axes X—X and Y—Y. The exact manner in which this magnetic levitation is accomplished is detailed by Wossidlo in his patent, which teaching is expressly incorporated herein by this reference to that patent, thus, further elaboration is deemed unnecessary.

While no provision is disclosed for adjusting the axial positions of magnets 42 and 52, relative to each other, it is appreciated that, if such adjustment is deemed important, support post 46 can be threaded and provided with a pair of lock nuts, as taught by Wossidlo in his patent, to effect a particular degree of magnetic levitation between magnets 42 and 52.

The previously mentioned tracking mirror 22, which is located in the incident path of beam 14, is mechanically coupled to magnet 52, by a cement or other binder, for concurrent displacement therewith. Positioned as shown in FIG. 1, that is, in the path of the reading beam, mirror 22 serves to redirect the path of the reading beam to maintain the beam in tracking and time base registration with track 12 in accordance with the dictates of error correction signals and in a manner to be described.

To that end, beam control apparatus 26 includes electro-magnetic means positioned along assigned ones of orthogonal axes X—X, Y—Y and in close proximity to magnet 52 and tracking mirror 22. More particularly, this means contemplates a first pair of deflection coils 58, 59 axially oriented along axes X—X and a second pair of coils 60, 61 axially oriented along axes Y—Y.

It will be assumed, for purposes of illustration, that axis X—X is coincident with a radius of the disc at the point where track 12 is being read while axis Y—Y is tangent to the track at the read point. Thus, a pivotal rotation of mirror 22 about the X—X axis would serve to displace the read beam parallel to the Y—Y axis and thereby effect a correction of time base or velocity error. On the other hand, a pivotal rotation of the mirror about the Y—Y axis would deflect the beam parallel to the X—X axis to effect a correction in radial tracking.

As seen in FIG. 2, the deflection coils comprises air core windings with each paired set disposed within assigned axially aligned openings in housing 40. To enhance sensitivity the coils are positioned as close as is practical to a damper 62 that surrounds magnet 52, which damper is described in detail below. In any event, and as shown in FIG. 4, X—X axis coils 58, 59 are electrically connected in series aiding relation and phased so that, upon energization by a radial correction signal from amplifier 36 the electromagnetic fields induced in the coils assume a direction and intensity dictated by the polarity and amplitude of the applied radial correction signal. This induced field reacts with the field of magnet 52 to the end that the magnet and its mirror 22 are pivoted about axis Y—Y a controlled amount to effect the proper radial registration of the read beam with track 12. In FIG. 4, the Y—Y axis is perpendicular to the plane of the drawing.

In like fashion, when Y—Y axis coils 60, 61 are energized by a timing correction signal, the fields induced in those coils will, upon reaction with the field of magnet 52, cause the magnet and mirror 22 to pivot about the X—X axis to displace the read beam in a direction to effect a correction of time base error. Since the circuit arrangement and mode of operation of the Y—Y axis coils are basically the same as that described in connection with the X—X axis coils, no counterpart of the FIG. 4 schematic is deemed necessary for the Y—Y axis explanation.

As previously noted, an electro-optical tracking apparatus of the type herein considered exhibits a pronounced mechanical resonance because of its inherent low mechanical damping. In order to counteract this resonance, which is manifested as a random, uncontrolled movement, or excursion, of magnet 52 and mirror 22 about pivot pin 50, damping means 62 is provided to arrest such movement. As best seen in FIG. 5, this damper comprises a generally circular ring or cup 62 which is formed of a conductive material and disposed adjacent magnet 52. As shown in FIG. 3, ring 62 is supported upon an internal shelf 64 of the housing in close proximity to and completely encircling magnet 52. The proximity of ring 62 to the magnet-mirror assembly 52, 22 is determinative of the amount of damping that is achieved. However, the cup must be spaced from that magnet a distance sufficient to preclude any interference with a desired displacement of the magnet and its mirror about pivot 50. The configuration of ring 62 was selected for purposes of effecting symmetrical damping about the X—X, Y—Y axes. It is appreciated that a series of conductive members intercepting the X—X and Y—Y axes and judiciously placed adjacent the deflection coils 58, 59 and 60, 61, would also achieve substantially symmetrical damping.

Referring again to FIGS. 2 and 3, the electro-magnetic deflection coils 58, 59 and 60, 61 are shown located within housing 40 in a substantial abutting but non-conductive contact with the rim of damper ring 62. In an embodiment of the invention actually reduced to practice, ring 62 is formed of copper, however, it is appreciated that this damping ring can be formed of any conductive material that is not ferromagnetic in nature.

Figure 6:
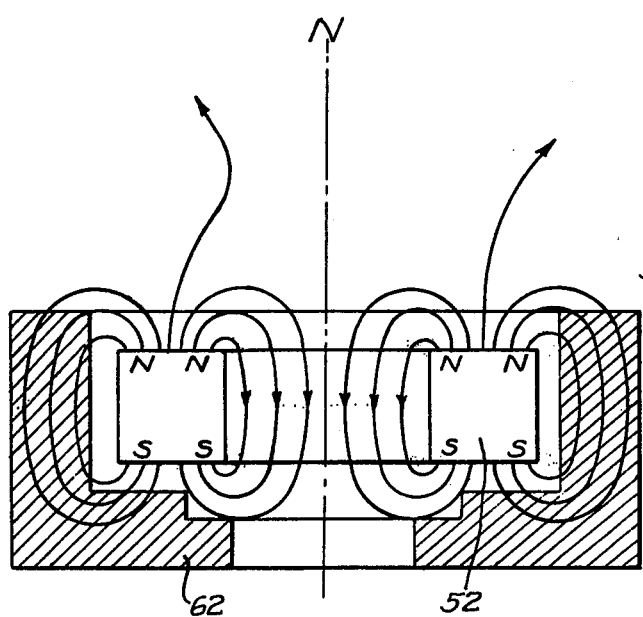
FIG. 6 is a schematic representation of the magnetic field pattern linking the sectioned magnet device and the damping means shown in FIG. 3.

Mounted in the manner shown in FIGS. 2 and 3, damper ring 62 is located in the magnetic flux field of magnet 52, see FIG. 6, so that any movement of magnet 52, moves the magnetic field through ring 62. This moving field, which penetrates the cup in the same fashion as it penetrates the surrounding air, induces eddy currents in the ring. These currents, in turn, induce an electromagnetic force that reacts with the field of magnet 52 to the end that it opposes the field of the magnet. This reaction of the induced electromagnetic force with the field of the magnet serves to arrest those undesired movements of the magnet attributable to its mechanical resonance.

Now, any movement of the magnet-mirror assembly will cause an electro-magnetic force to be induced in the damper. This force, however, will be proportional to the velocity of the moving magnet-mirror assembly. Since the excursion velocity of the magnet-mirror assembly at mechanical resonance is very rapid, the electromagnetic force induced thereby will be substantial. On the other hand, when the magnet-mirror assembly is intentionally displaced, as when correction signals are applied to coils 58, 59 and/or coils 60, 61, the velocity of that displacement will be relatively small so that the electromagnetic force induced will be correspondingly minimal. Accordingly, damping of the undesired movement of the magnet-mirror assembly at resonance is achieved without inhibiting any desired low-velocity displacement of that assembly.

Figure 7:
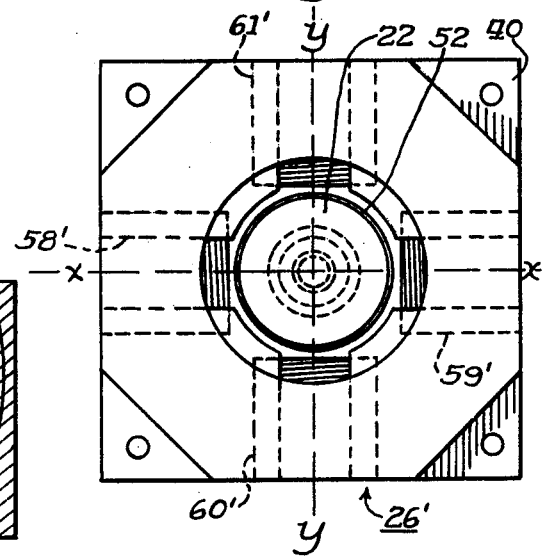
FIG. 7 is a plan view of an alternate embodiment of the beam control apparatus shown in FIG. 2.

An alternate embodiment of the invention dispenses with damping ring 62 and substitutes therefor an electronic damping means to achieve the same objective. More particularly, and with reference to FIGS. 7 and 8 there is disclosed a beam control apparatus 26' similar, in most respects, to the beam controller 26 of the principal embodiment but omitting the damping cup. Accordingly, like reference numerals are employed for identical structure in FIGS. 7 and 8 while primed numbers are used for similar or counterpart structure. In the alternate embodiment, an identical magnet, mirror and pivot support arrangement is again employed, thus, no further description of that apparatus is required. The embodiment of FIGS. 7 and 8 departs from the principal embodiment in that one of the deflecting electromagnets in each pair is utilized as the damping means. More particularly, and as shown in FIG. 7, electromagnet pairs 58', 59' and 60' and 61' are positioned in such proximity to magnet 52 as to be tightly coupled thereto but still spaced therefrom a distance sufficient to permit a desired displacement of magnet 52 about pivot pin 50. Again, for purposes of explanation, only one set of electromagnets, in this case, X—X axis coils 58' and 59', are selected to exemplify the invention.

Figure 8:
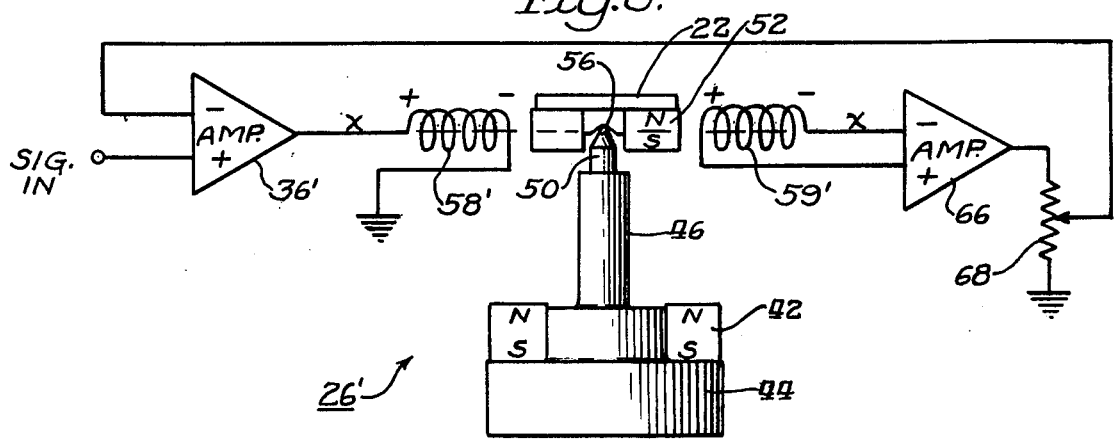
FIG. 8 is a schematic representation of the beam control apparatus of FIG. 7 in association with an electronic damping means and an energizing circuit.

FIG. 8 depicts the manner in which coil 59' is arranged to form, along the X—X axis, an electronic damper for magnet 52 and mirror 22. It should first be noted that now only coil 58' is employed as a deflection device responsive to energization by correction signals from amplifier 36' to develop a field to react with the field of magnet 52. Coil 59', on the other hand, assumes the role of a sensing coil in that any undesired movement of magnet 52 will cause a voltage proportional to the velocity of such undesired movement to be generated in that coil. This voltage is amplified in the amplifier 66 and applied through amplifier 36' to deflection coil 58' in phase opposition to a voltage which, if applied to coil 58', would have produced the aforesaid undesired movement. The gain of the amplifier 66 is controlled by the adjustable impedance 68, or a similar gain control device, to provide the desired correction voltage input to amplifier 36'. An advantage of the alternate embodiment of FIGS. 7 and 8 is, of course, the elimination of damping cup 62. However, this advantage may be considered in the nature of a tradeoff since, in the beam controller 26' of FIG. 8, there is a two-to-one reduction in deflection sensitivity as compared to controller 26 of FIG. 5. This obtains since the principal embodiment of FIG. 5 utilizes two deflection coils on each of the orthogonal axes for effecting radial and time base correction while the alternate embodiment utilizes but a single deflection coil on each of the orthogonal axes.

In conclusion, I reiterate that relevant portions of the cited Adler et al, Laub and Korpel patent applications and of the Wossidlo, Korpel and Stewart patents are intended to be, and are, expressly incorporated herein by this and by the previous reference to those applications and patents.

While particular embodiments of the invention have been shown and described, it will be obvious to those skilled in the art that changes and modifications may be made thereto without departing from the invention in its broader aspects and, therefore, the aim in the appended claims is to cover all such changes and modifications as fall within the true spirit and scope of the invention.

What is claimed is:

1. In an optical image-reproducing system in which program information stored in a generally spiral track is retrieved by scanning the track with a beam of optical energy and in which is derived a pair of correction signals related to the radial tracking and to the timing of said beam relative to said track, an improved beam control apparatus comprising:

a first ring-shaped, axially poled magnet;

a second axially-poled magnet having a pivot bearing associated therewith and poled in the same direction as said first magnet;

support means comprising a pin cooperating with said bearing for pivotally positioning said second magnet coaxially with and in such proximity to said first magnet that said second magnet is magnetically captivated upon said pin but free for tilting displacement with respect to a pair of orthogonally related axes;

an optical element positioned so that said beam is incident thereon and mechanically coupled to said second magnet for concurrent displacement therewith to redirect the path of said beam;

electromagnetic means positioned along an assigned one of said axes in close proximity to said second magnet and responsive to one of said correction signals to develop a magnetic field, having a magnitude and direction determined by the amplitude and polarity of said applied correction signal, for reacting with the field of said second magnet to effect a desired displacement of said optical element about the other one of said axes; and damping means comprising a conductive member disposed adjacent to and completely surrounding said second magnet and responsive to the magnetic flux of the field of said second magnet for developing a counter electromagnetic force for reacting with said field of said second magnet to arrest random or uncontrolled movement of said second magnet about said support pin without inhibiting said desired displacement of said optical element.

2. A beam control apparatus as set forth in claim 1 in which said conductive member comprises a copper ring.

* * * * *